(12) United States Patent
Hehn et al.

(10) Patent No.: US 12,219,447 B2
(45) Date of Patent: Feb. 4, 2025

(54) LOCATION OF NEIGHBOURING V2X-CAPABLE VEHICLES

(71) Applicant: AUDI AG, Ingolstadt (DE)

(72) Inventors: Thorsten Hehn, Ingolstadt (DE); Julia Rainer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 99 days.

(21) Appl. No.: 17/923,141

(22) PCT Filed: May 4, 2021

(86) PCT No.: PCT/EP2021/061637
§ 371 (c)(1),
(2) Date: Nov. 3, 2022

(87) PCT Pub. No.: WO2021/224214
PCT Pub. Date: Nov. 11, 2021

(65) Prior Publication Data
US 2023/0179971 A1    Jun. 8, 2023

(30) Foreign Application Priority Data
May 6, 2020   (DE) .................. 10 2020 112 270.5

(51) Int. Cl.
*H04W 4/46*        (2018.01)
*G08G 1/16*        (2006.01)
(Continued)

(52) U.S. Cl.
CPC ................ *H04W 4/46* (2018.02); *G08G 1/16* (2013.01); *G08G 1/166* (2013.01); *H04W 4/38* (2018.02); *B60Q 1/26* (2013.01)

(58) Field of Classification Search
CPC .......... G08G 1/091; G08G 1/16; G08G 1/166; G05D 1/0221; G05D 1/0289; H04L 5/00;
(Continued)

(56) References Cited

U.S. PATENT DOCUMENTS 10,467,907 B2   11/2019   Pilkington et al.
2018/0077518 A1*  3/2018   Nguyen .................. H04W 4/06
(Continued)

FOREIGN PATENT DOCUMENTS

CN         107979812 A     5/2018
DE   10 2006 055 344 A1   5/2008
(Continued)

OTHER PUBLICATIONS

NPL Searcjh (Mar. 27, 2024).*
(Continued)

*Primary Examiner* — Van T Trieu
(74) *Attorney, Agent, or Firm* — STAAS & HALSEY LLP

(57) ABSTRACT

A method of locating a second V2X-capable vehicle by a first V2X-capable vehicle is described. A request is transmitted from the first vehicle to the second vehicle via a V2X communication connection, sensor data from at least one sensor of the second vehicle are received by the first vehicle via the V2X communication connection and are evaluated. At least one action is carried out by the first vehicle, the second vehicle is located relative to the first vehicle if the at least one action by the first vehicle is detected on the basis of the received sensor data from the at least one sensor of the second vehicle. A system is also described.

9 Claims, 1 Drawing Sheet

(51) Int. Cl.
*H04W 4/38* (2018.01)
*B60Q 1/26* (2006.01)

(58) Field of Classification Search
CPC ........... H04W 4/00; H04W 4/38; H04W 4/46; H04W 4/80
See application file for complete search history.

(56) References Cited

U.S. PATENT DOCUMENTS

| | | | |
|---|---|---|---|
| 2019/0281027 A1* | 9/2019 | Cao | H04L 63/0442 |
| 2020/0090518 A1* | 3/2020 | Sano | G08G 1/0125 |
| 2020/0250898 A1* | 8/2020 | Rafferty | B60H 1/00807 |
| 2020/0342760 A1* | 10/2020 | Vassilovski | G08G 1/161 |
| 2020/0374053 A1* | 11/2020 | Hwang | H04W 4/40 |
| 2022/0103986 A1* | 3/2022 | Hwang | H04W 4/44 |

FOREIGN PATENT DOCUMENTS

| | | |
|---|---|---|
| DE | 10 2015 221 184 A1 | 5/2017 |
| EP | 3 462 754 A1 | 4/2019 |
| JP | 2019-220858 | 12/2019 |
| SE | 542 020 C2 | 2/2020 |

OTHER PUBLICATIONS

Notification of English Translation of IPRP (PCT/IB/338) (Nov. 10, 2022) and the English translation of IPRP (PCT/IPEA/409) issued in International Application No. PCT/EP2021/061637 dated Aug. 11, 2022.

\* cited by examiner

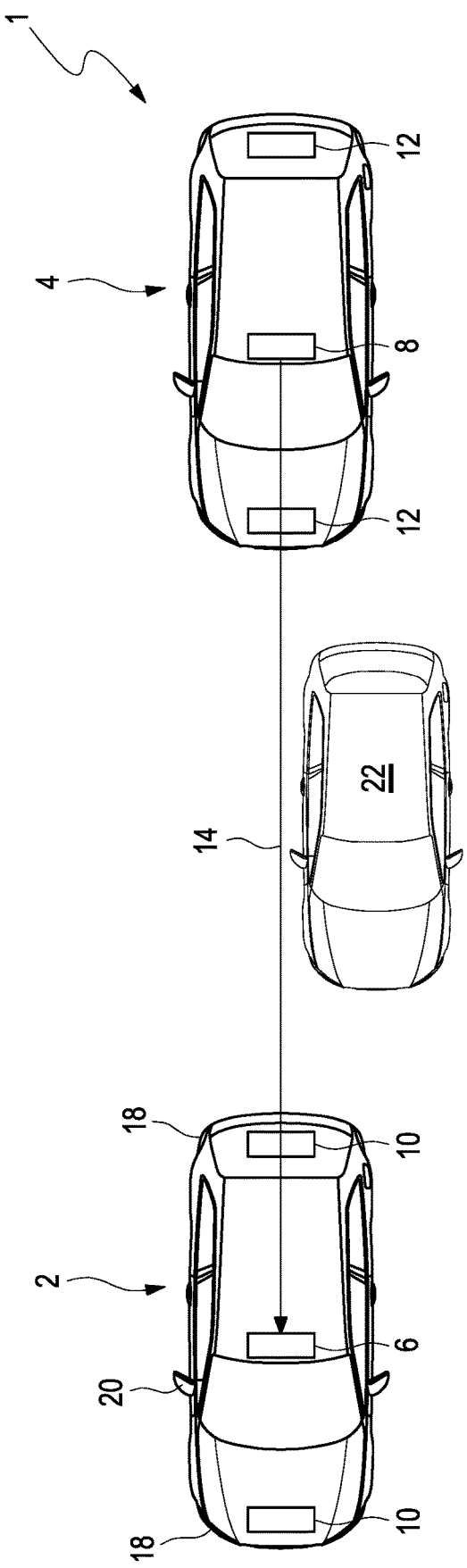
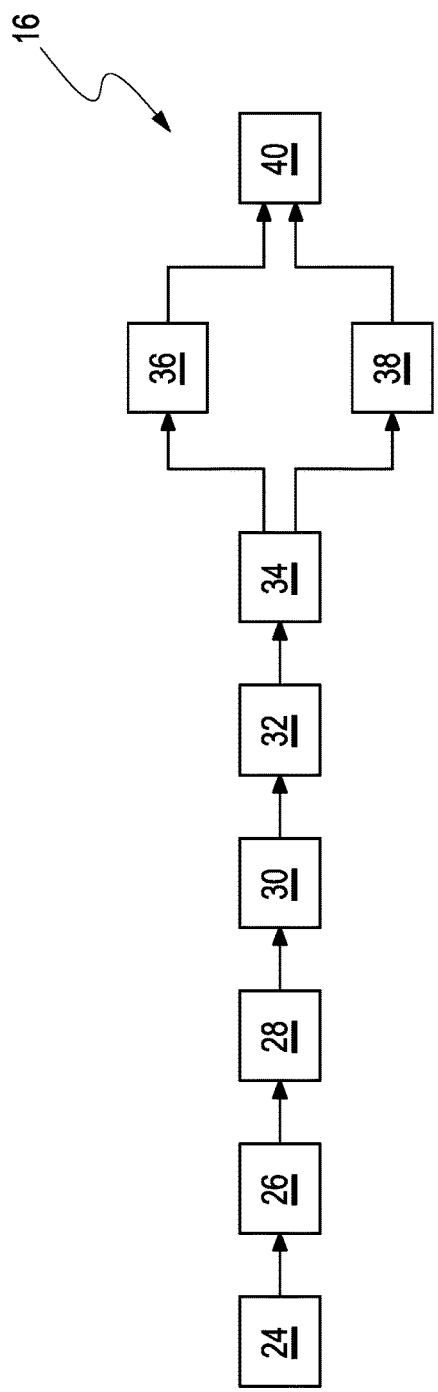
Fig. 1
Fig. 2

LOCATION OF NEIGHBOURING V2X-CAPABLE VEHICLES

CROSS-REFERENCE TO RELATED APPLICATIONS

This application is a U.S. national stage of International Application No. PCT/EP2021/061637, filed on May 4, 2020, which International Application claims the priority benefit of German Application No. 10 2020 112 270.5 filed on May 6, 2020. Both the International Application and the German Application are incorporated by reference herein in their entirety.

FIELD

The invention according to the described examples relates to a method for locating a second V2X (vehicle-to-everything)-capable vehicle by a first V2X-capable vehicle. The examples also relates to a system having a first V2X-capable vehicle and at least one second V2X-capable vehicle.

BACKGROUND

Communication technology is becoming increasingly important in road traffic and has the potential to increase traffic safety. In this case, V2X communication connections may be used to make it possible to interchange data between V2X-capable vehicles and a V2X-capable infrastructure. Depending on the traffic situation, it is necessary to detect whether the V2X-capable vehicles are vehicles which are directly adjacent to one another or whether there are further road users or obstacles between the V2X-capable vehicles. Such a check is required, for example, if a plurality of vehicles approach traffic lights at the same time as a so-called road train. The road train function cannot be reliably performed if there are non-networked or non-V2X-capable vehicles between the vehicles.

Methods based on GNSS localization are already known for determining the positions of the V2X-capable vehicles. However, GNSS (global navigation satellite system)-based localization is not comprehensively available and has inadequate accuracy.

DE 10 2015 221 184 A1 discloses a method and an apparatus for communicating in road traffic. An item of assignment information is determined for at least one road user in a road region. A trigger message is transmitted to one or more road users in the road region via a wireless communication connection. The trigger message is aimed at causing a function of a road user in a predetermined manner. The method also comprises detecting that a first road user actuates the function in the predetermined manner, and determining a property of the first road user.

SUMMARY

The described examples include a method and a system, by which two V2X-capable vehicles can locate one another and non-V2X-capable vehicles can be identified.

According to the examples, a method may have the features recited in the claims. Advantageous configurations and developments emerge from the dependent claims.

The method according to the examples is used to locate a second V2X-capable vehicle by a first V2X-capable vehicle. In one step, a request is transmitted from the first vehicle to the second vehicle via a V2X communication connection. In this case, sensor data from at least one sensor of the second vehicle are received by the first vehicle via the V2X communication connection and are evaluated. The at least one sensor may be, for example, a camera sensor, a lidar sensor, a radar sensor, an ultrasonic sensor, a thermographic camera and the like.

In a further step, at least one action is carried out by the first vehicle. The second vehicle is then located relative to the first vehicle if the at least one action by the first vehicle is detected on the basis of the received sensor data from the at least one sensor of the second vehicle.

If the first vehicle can "find itself again" on the basis of the sensor data from the second vehicle, both vehicles are direct neighboring vehicles. The first vehicle can determine its relative position with respect to the second vehicle on the basis of the sensor data and the orientation of the respective sensors of the second vehicle.

In particular, the method can be used to determine whether a second V2X-capable vehicle is directly in front of the first vehicle, behind the first vehicle and/or to the side of the first vehicle, or whether there is also a further, non-V2X-capable vehicle in between.

The method makes it possible to locate neighboring vehicles in a relative manner on the basis of a V2X communication connection. In this case, it is not necessary to access GNSS satellites.

In this case, the second vehicle acts as a mirror for the first vehicle and provides only sensor data from the at least one sensor. The at least one action by the first vehicle can be freely selected and can be carried out depending on the situation. For example, a steering lock can be carried out while the first vehicle is at a standstill. Alternative actions, for example light signals or movements of the side mirrors, may be advantageous during the journey.

In order to provide a continuous and stable sensor data stream, the V2X communication connection can be checked before the sensor data are evaluated.

The detection of the action by the first vehicle on the basis of the sensor data from the second vehicle by the first vehicle can be matched to the action, as a result of which it is possible to analyze the sensor data in a technically simple manner. There is no need for a corresponding implementation of the detection algorithms in the second vehicle since only the sensor data from the second vehicle are forwarded to the first vehicle. This makes it possible for the first vehicle to use so-called sensor sharing of the second vehicle.

In one advantageous configuration, at least one non-V2X-capable vehicle or an obstacle between the first vehicle and the second vehicle is determined if the at least one action by the first vehicle is not detected on the basis of the received sensor data from the at least one sensor of the second vehicle. This measure makes it possible to check in a technically simple manner whether the first vehicle and the second vehicle are direct neighboring vehicles.

According to a further exemplary embodiment, a light signal is generated by the first vehicle as at least one action, wherein the light signal is generated by activating, deactivating and/or changing a brightness or frequency of at least one luminous means (device, for example, light emitting diode (LED), configured to emit light) of the first vehicle. The luminous means can be used to enable speed-independent signaling which can be detected by optical sensors of the second vehicle. In this case, the light signal can be generated in a wavelength range which is visible or invisible to a human eye.

Furthermore, individual LEDs of a luminous means can be briefly activated or deactivated selectively or together.

Such signaling can be achieved, for example, by controlling LEDs of indicator lights, taillights, brake lights and/or daytime running lights.

According to a further embodiment, the light signal is generated by the first vehicle as a light signal sequence. Such a light signal sequence may comprise, for example, a plurality of changes to the brightness and/or the operating frequency of the luminous means which are carried out in succession and may therefore ensure improved reliability when detecting the action.

According to a further exemplary embodiment, a digital signature is transmitted by the light signal which has been generated. For example, the brightness or intensity of individual LEDs or luminous means of the first vehicle can be modulated in a manner unnoticed by the human eye. Such a measure can be used for the coded transmission of information. In this case, information can be cryptographically secured and/or provided with a digital signature.

According to a further exemplary embodiment, a movement is carried out by the first vehicle as at least one action. In particular, according to a further advantageous configuration, a driving maneuver, a steering lock movement, a side mirror movement, a windshield wiper movement, a sensor movement and/or a handle movement can be carried out by the first vehicle as at least one action. This measure can be used to prompt a vehicle movement by the first vehicle that is visible to the sensor system of the second vehicle. In this case, the movement can be captured by different sensors, for example radar sensors, lidar sensors or camera sensors, and can therefore be redundantly detected.

Alternatively or additionally, any driven components of the first vehicle can be used to carry out a movement or a movement sequence. For example, mirrors can be folded in, a reversing camera can be retracted or extended, a windshield washing system can be actuated and the like.

According to a further exemplary embodiment, a heat signature is generated by the first vehicle as at least one action, wherein the heat signature is generated by activating a window heating system, a mirror heating system and/or a sensor heating system. This action can be advantageously carried out if the second vehicle has a thermally sensitive camera. As a result, thermal infrared beams can be generated by the first vehicle and can be detected by the sensor sharing function in order to detect the at least one action by the first vehicle.

Locating the second vehicle with the aid of the evaluation of the sensor data from the second vehicle by the first vehicle can be carried out on the basis of the orientation of the respective sensors, the distance and the perspective. In particular, the sensor data from the second vehicle can be used as a mirror image of the first vehicle, with the result that at least rough positioning of the first vehicle with respect to the second vehicle can be determined. In particular, it is possible to determine whether the first vehicle is in front of the second vehicle, behind the second vehicle or to the side of the second vehicle.

A further aspect of the examples may include a system having a first V2X-capable vehicle and at least one second V2X-capable vehicle. The system is configured to carry out the method according to the described examples.

Carrying out the method enables a technically simple and efficient check which can be used to determine non-V2X-capable vehicles between two V2X-capable vehicles.

BRIEF DESCRIPTION OF THE DRAWINGS

These and other aspects and advantages will become more apparent and more readily appreciated from the following description of examples, taken in conjunction with the accompanying drawings, where like reference numerals refer to like elements throughout:

FIG. 1 shows a system according to an example, and

FIG. 2 shows a flowchart for illustrating the method according to an example.

DETAILED DESCRIPTION

FIG. 1 shows a system 1 according to an example. The system 1 has a first V2X-capable vehicle 2 and a second V2X-capable vehicle 4.

The first vehicle 2 and the second vehicle 4 each have a control device 6, 8 which can receive sensor data from the respective vehicle sensors 10, 12 and can transmit sensor data via a V2X communication connection 14. In this case, the V2X communication connection 14 may be based on a WLAN, GSM, LTE, UMTS, 5G and/or comparable transmission standard.

In particular, the control devices 6, 8 of the vehicles 2, 4 can establish a V2X communication connection 14 and can transmit sensor data, information and requests.

The second vehicle 4 can transmit sensor data from its sensor system 12 to the control device 6 of the first vehicle 2 via the control device 8, for example.

The control device 6 of the first vehicle 2 may receive and evaluate the sensor data from its sensor system 10 and from the sensor system 12 of the second vehicle 4.

The vehicles 2, 4 may have, as sensors 10, 12, lidar sensors, radar sensors, reversing cameras, ultrasonic sensors, video sensors and the like, for example.

In order to carry out the method 16 shown in FIG. 2, the first vehicle 2 can carry out actions which can be achieved, for example, by luminous means 18, by movements of the side mirrors 20 and the like.

FIG. 2 illustrates a flowchart for illustrating the method 16 according to an example. The method 16 is used to locate a second V2X-capable vehicle 4 by a first V2X-capable vehicle 2. By virtue of the method 16, the first vehicle 2 can find out, for example, whether a non-V2X-capable vehicle 22 is arranged between the first vehicle 2 and the second vehicle 4.

In a step 24 of the method 16, a request is transmitted from the first vehicle 2 to the second vehicle 4 via the V2X communication connection 14. In this case, it is possible to implement role division of the vehicles 2, 4, in which one vehicle 4 acts as a mirror and one vehicle 2 acts as an actuator. In the exemplary embodiment illustrated, the second vehicle 4 acts as a mirror for the first vehicle 2 and enable sensor sharing.

In a further step 26, the sensor data from the sensor system 12 of the second vehicle 4 are made available to the first vehicle 2 via the V2X communication connection 14. The sensor data may be provided in the form of a so-called live sensor view and may be evaluated by the control device 6 of the first vehicle 2. In this case, the first vehicle 2 may access camera sensors, lidar sensors, thermographic cameras, ultrasonic sensors and the like of the second vehicle 4.

In an optional step 28, continuous reception of sensor data via the V2X communication connection 14 can be checked.

The first vehicle 2 then carries out 30 at least one action as an actuator and examines 32 the received sensor data from the second vehicle 4 with respect to this action.

The at least one action by the first vehicle 2 can be freely selected. For example, the first vehicle 2 can carry out a driving maneuver or can move the entire vehicle 2 or can move individual components 20. For example, the first vehicle 2 may electronically fold the side mirrors 20 in and out. As further possible actions, a steering lock can be changed, a reversing camera can be extended or oriented, trunk handles can be extended, a window can be opened, the windshield wiper washing system can be actuated and the like.

Depending on the configuration, luminous means 18 may also be used to carry out the at least one action. For example, luminous means 18 of the first vehicle 2 may be activated and deactivated and/or their brightness or operating frequency can be adjusted.

If the at least one action by the first vehicle 2 is detected 34 on the basis of the received sensor data from the at least one sensor 12 of the second vehicle 4, a clear decision or probability-based statement on the neighborhood relationship between the first vehicle 2 and the second vehicle 4 can be made. In particular, the second vehicle 4 can be located 36 relative to the first vehicle 2 if the first vehicle 2 detects its own actions and therefore itself in the sensor data from the second vehicle 4.

Alternatively, at least one non-V2X-capable vehicle 22 or an obstacle between the first vehicle 2 and the second vehicle 4 may be determined 38 if the at least one action by the first vehicle 2 is not detected on the basis of the received sensor data from the at least one sensor 12 of the second vehicle 4.

A notification 40 relating to the result can then be transmitted to the second vehicle 4 via the V2X communication connection 14.

A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in Superguide v. DIRECTV, 358 F3d 870, 69 USPQ2d 1865 (Fed. Cir. 2004).

LIST OF REFERENCE SIGNS

1 System
2 First vehicle
4 Second vehicle
6 Control device of the first vehicle
8 Control device of the second vehicle
10 Sensor system of the first vehicle
12 Sensor system of the second vehicle
14 Communication connection
16 Method
18 Luminous means of the first vehicle
20 Side mirror of the first vehicle
22 Non-V2X-capable vehicle
24 Transmit a request
26 Provide sensor data
28 Check continuous reception
30 Carry out an action
32 Evaluate sensor data relating to an action
34 Detect an action
36 Locate the second vehicle relative to the first vehicle
38 Detect an obstacle or non-V2X-capable vehicle
40 Transmit the result

The invention claimed is:

1. A method of locating a second vehicle-to-everything-capable vehicle by a first vehicle-to-everything-capable vehicle, the method comprising:
    transmitting a request from the first vehicle-to-everything-capable vehicle to the second vehicle-to-everything-capable vehicle via a vehicle-to-everything communication connection,
    receiving, by the first vehicle-to-everything-capable vehicle, sensor data from at least one sensor of the second vehicle-to-everything-capable vehicle via the vehicle-to-everything communication connection,
    evaluating, by the first vehicle-to-everything-capable vehicle, the received sensor data, and
    carrying out, by the first vehicle-to-everything-capable vehicle, at least one action to locate the second vehicle-to-everything-capable vehicle, the second vehicle-to-everything-capable vehicle being located relative to the first vehicle-to-everything-capable vehicle if the at least one action carried out by the first vehicle-to-everything-capable vehicle is detected on basis of the received sensor data received from the at least one sensor of the second vehicle-to-everything-capable vehicle.

2. The method as claimed in claim 1, wherein at least one non-vehicle-to-everything-capable vehicle or an obstacle between the first vehicle-to-everything-capable vehicle and the second vehicle-to-everything-capable vehicle is determined if the at least one action by the first vehicle-to-everything-capable vehicle is not detected on the basis of the received sensor data.

3. The method as claimed in claim 1, wherein a light signal is generated by the first vehicle-to-everything-capable vehicle as the at least one action, wherein the light signal is generated by activating, deactivating and/or changing a brightness or frequency of at least one luminous device of the first vehicle-to-everything-capable vehicle.

4. The method as claimed in claim 3, wherein the light signal is generated by the first vehicle-to-everything-capable vehicle as a light signal sequence.

5. The method as claimed in claim 3, wherein a digital signature is transmitted by the light signal which has been generated.

6. The method as claimed in claim 1, wherein a movement is carried out by the first vehicle-to-everything-capable vehicle as the at least one action.

7. The method as claimed in claim 6, wherein a driving maneuver, a steering lock movement, a side mirror movement, a windshield wiper movement, a sensor movement and/or an electrical handle movement is carried out by the first vehicle-to-everything-capable vehicle as the at least one action.

8. The method as claimed in claim 1, wherein a heat signature is generated by the first vehicle-to-everything-capable vehicle as the at least one action, wherein the heat signature is generated by activating a window heating system, a mirror heating system and/or a sensor heating system.

9. A system having a first vehicle-to-everything-capable vehicle and at least one second vehicle-to-everything-capable vehicle, wherein the system is configured to carry out the method of claim 1.

* * * * *

UNITED STATES PATENT AND TRADEMARK OFFICE
CERTIFICATE OF CORRECTION

| | | |
|---|---|---|
| PATENT NO. | : 12,219,447 B2 | Page 1 of 1 |
| APPLICATION NO. | : 17/923141 | |
| DATED | : February 4, 2025 | |
| INVENTOR(S) | : Thorsten Hehn et al. | |

It is certified that error appears in the above-identified patent and that said Letters Patent is hereby corrected as shown below:

On the Title Page

Column 2, Other Publications Line 1, Delete "Searcjh" and insert -- Search --.

In the Specification

Column 1, Line 9, Delete "2020," and insert -- 2021, --.

Signed and Sealed this
Ninth Day of September, 2025

Coke Morgan Stewart
*Acting Director of the United States Patent and Trademark Office*